United States Patent Office 3,415,798
Patented Dec. 10, 1968

3,415,798
PRODUCTION OF TERPENE RESINS
Henry G. Sellers, Jr. and Henry E. McLaughlin, Pensacola, Fla., assignors to Tenneco Chemicals, Inc., a corporation of Delaware
No Drawing. Original application Oct. 3, 1963, Ser. No. 313,416, now Patent No. 3,297,673. Divided and this application Nov. 1, 1966, Ser. No. 620,567
6 Claims. (Cl. 260—93.3)

This application is a division of Ser. No. 313,416, filed Oct. 3, 1963, now Patent No. 3,297,673.

This invention relates to improvements in the method of producing terpene resins in a high yield which are very light in color.

Various terpenes including beta-pinene, alpha-pinene, dipentene, and the like having the empirical formula $C_{10}H_{16}$, have been polymerized in a solvent and in the presence of a metal halide catalyst of the Friedel-Crafts type, for example, $AlBr_3$, $BF_3$, $ZrCl_3$, $AlCl_3$, $$BF_3 \cdot (C_2H_5)_2O$$

and the like. After polymerization, the polymer solution may be neutralized with calcium oxide or hydroxide and an adsorbent material, for example, finely divided clay may be added. This mixture preferably is heated under reflux to decolorinate the mixture and some of the solvent may be removed. Thereafter, the mixture is filtered and the filtrate is distilled to remove the solvent.

It has been discovered that higher yields and lighter-colored resins are obtained in a more readily controlled reaction by the use of a combination of solvents, each of which is a solvent for the terpene monomer as well as the terpene polymer. The combination of solvents includes at least one aromatic solvent, for example, toluene, and at least one aliphatic hydrocarbon solvent, for example, petroleum naphtha. Polymerization is effected in the solvent medium comprising toluene and naphtha and thereafter, the toluene is removed prior to filtration of the adsorbent which contains the color bodies. Since toluene is a solvent for the catalyst complex and reduces the tendency of the catalyst or catalyst complex to separate and collect on the walls of the reaction chamber, the heat of the exothermic reaction can be readily removed from the system in a controlled manner to avoid excessively high temperatures from developing. The toluene is removed prior to recovery of the polymer as the toluene is a better solvent for the color bodies than the naphtha and the presence of a substatnial amount of the toluene inhibits separation of the color bodies by the adsorbent material.

In a preferred procedure involving the polymerization of dipentene with aluminum chloride as a catalyst, a mixture of the catalyst and solvent containing toluene and naphtha is prepared. Thereafter, the dipentene is gradually added to the agitated polymerization medium and the reaction mixture cooled, if necessary, to maintain the desired reaction temperature. By this procedure the temperature during the polymerization can be better controlled, particularly on large scale production, to avoid undesirably high temperatures which result in darker resins. After the reaction is complete, the polymer solution is neutralized and preferably heated under reflux to remove hydrochloric acid. Either during the foregoing step or thereafter, substantially all of the toluene is removed by distillation. Thereafter, a substantially toluene-free solution of the polymer is heated in the presence of and filtered from an adsorbent material which aids in removing the color bodies and other impurities. The catalyst may be removed by the filtration step or it may be separated prior thereto, for example, by decantation, or both. After filtration the solvent is separated from the polymer, preferably by distillation and with the aid of a steam sparge. By this procedure dipentene resins of light color can be obtained in high yield.

While toluene has been found to be a highly satisfactory solvent, other aromatic solvents which are a solvent for the monomer as well as the polymer may be used. For example, benzene and xylenes may be used. The aromatic hydrocarbon solvent should have a boiling point below the boiling point of the aliphatic hydrocarbon solvent so that the aromatic solvent may be readily removed from the polymer solution prior to heating in the presence of and filtration from an adsorbent material. If a substantial amount of the aromatic solvent is present at the time of filtration, the resulting resin will have a darker color as this solvent is a better solvent for the color bodies than naphtha and inhibits their removal by the adsorbent material.

Any aliphatic hydrocarbon solvent may be used which is a solvent for the monomer as well as the polymer and which has a boiling point above the boiling point of the aromatic solvent. The petroleum hydrocarbons, such as kerosene, mineral spirits, and naphtha, may be used. Preferably the aliphatic hydrocarbon solvent has a boiling point below 200° C. to facilitate its removal by distillation without overheating the polymer. Commercial grades of the two solvents may be used that have overlapping boiling point ranges as long as the aromatic solvent can be removed by distillation leaving a major portion of the aliphatic solvent.

The total amount of solvent is the amount which will form solutions having the desired viscosity to facilitate handling and filtration. Normally the amount of solvent will vary from about 60% to 100% by weight of the dipentene charged. Larger amounts of solvent may be used. However, this increases the cost of removing the solvent. An important advantage of toluene is that it permits the use of less total solvent. The minimum amount of toluene depends to a certain extent upon the amount of catalyst and the temperature of the polymerization reaction. Normally the amount of toluene will vary from about 25% to 50% by weight of the amount of dipentene. If the polymerization temperature is in the range of 40°–55° C., then the amount of toluene should constitute at least 20% by weight of the dipentene charged. At lower reaction temperatures somewhat more toluene is required to dissolve the catalyst-dipentene complex. For example, at a reaction temperature of 30° C. a minimum of 30 pounds of toluene per 100 pounds of dipentene is required. At a reaction temperature of 20° C. a minimum of 40 pounds of toluene is required. An excess of toluene may be used. However, this increases the cost of distillation to remove the toluene prior to filtration with an adsorbent material and, in general, an amount of toluene in the range of about 25% to 50% by weight of the dipentene has been found to be highly satisfactory. The remainder of the solvent system consists of the aliphatic hydrocarbon solvent.

In the following examples, all percentages are by weight.

EXAMPLE 1

The naphtha described in this example was petroleum naphtha having a boiling point range of 118° C. to 148° C. Into a reactor there was charged 4,300 pounds of naphtha and 7,100 pounds of toluene. The solvent was heated to remove any water which would tend to inactivate the catalyst. Thereafter a slurry of 800 pounds of aluminum chloride in 1,800 pounds of naphtha was added and the mixture agitated. Over a period of five hours 21,100 pounds of dipentene was gradually charged while maintaining the reaction temperature in the range of 43° C. to 50° C. It has been found that the reaction can be more readily controlled by adding the dipentene to the solvent and catalyst. The charge was agitated for an additional 30 minutes at the same temperature to complete the reaction. A slurry of 800 pounds of calcium hydroxide in 1,800 pounds of naphtha was added to the reaction mixture. A slurry of 800 pounds of finely-divided clay and 1,800 pounds of naphtha also was added to the reactor. The temperature was gradually raised to 150° C. with reflux and 10,800 pounds of solvent was removed. The removed solvent contained substantially all of the toluene and some of the naphtha. The solution was then maintained under full reflux for four hours to remove gaseous hydrochloric acid. The resulting reaction mixture was filtered hot.

The clarified solution of dipentene resin was heated and discharged into a finishing still where most of the solvent was removed by flash distillation. The pot temperature was gradually raised to 220° C. to remove the residual solvent and thereafter the material was sparged with steam at the rate of 2,300 pounds per hour for 3 hours. During the sparging operation, some residual hydrochloric acid was removed as well as some of the lower boiling components primarily consisting of dimers and trimers of dipentene. Thereafter, the resin was steamed at 220° C. until the desired melting point of the resin was obtained.

A typical resin prepared as described will have a Gardner color of about 2 and a softening point of 110°–120° C. The Gardner color is determined with a 50% solution in mineral spirits and the softening point is determined by the ball and ring method. ASTM E–28–58T. The softening point can be varied depending upon the amount of low boiling components which are removed.

EXAMPLE 2

The polymerization reaction was carried out in a flask equipped with an agitator, a thermometer, and an addition funnel. A mixture comprising 10 g. of aluminum chloride, 250 g. of toluene, and 250 g. of naphtha (an aliphatic petroleum hydrocarbon fraction boiling in the range of 118°–148° C.) was added to the flask and agitated. Five hundred grams of dipentene was gradually added to the solution and the polymerization reaction was easily initiated and was carried out at a temperature of 40° C. After the addition of the dipentene was complete, the mixture was allowed to stand for one hour and thereafter, 25 g. of calcium hydroxide and 25 g. of acid-activated clay were added. The flask was equipped with a reflux condenser and a water trap. The mixture was heated with stirring and solvent removed through the trap until the temperature in the flask reached 140° C. This removed all of the toluene and a small amount of the naphtha. The mixture was refluxed overnight without the removal of any additional solvent. The resin solution was separated by filtration while hot. The clarified solution was then distilled to a pot temperature of 210–220° C. to remove the solvent and sparged with steam until 500 ml. of water was formed in the distillate. The resulting resin weighed 350 g., had a ball and ring softening point of 113° C., and a 50% solution in mineral spirits had a Gardner color of 1.

EXAMPLE 3

A polydipentene resin was produced in the same manner as described in Example 2 except that no toluene was used. The flask was charged with 500 g. of naphtha (B.P. 118–148° C.) and 10 g. of aluminum chloride. Five hundred g. of dipentene was added gradually through the funnel. Below 50° C. polymerization did not occur until a large excess of dipentene had been added and then the polymerization reaction was accompanied by a sudden rise in temperature. As a result the reaction was carried out at 55°–60° C. After the addition of dipentene was complete, the mixture was allowed to stand for one hour to complete the reaction. A reflux condenser was added to the flask in place of the addition funnel after 25 g. of lime and 25 g. of acid-activated clay had been added. The mixture was heated with stirring and solvent was removed until the pot temperature reached 140° C. No more solvent was removed and the mixture was refluxed overnight. Thereafter, the solution was filtered while hot and the filter cake was washed with naphtha. The resin solution containing the wash naphtha was heated to a pot temperature of 210–220° C. with a steam sparge until 500 ml. of water was formed in the distillate. The resinous product weighed 270 g., had a softening point of 39° C., and a 50% solution in mineral spirits had a Gardner color of 6–5.

Without the toluene the yield was lower and the reaction was difficult to control. The sudden rise in temperature caused an increase in the color. In addition to the lower yield, it is to be noted that the resin produced without toluene had a much lower softening point indicating the presence of a relatively large amount of dimer and trimer. While the softening point of the resin could be increased by removing some of these low boiling components, this would further reduce the yield of desirable higher molecular weight polymer product.

The temperature at which polymerization is effected also influences the yield and the characteristics of the resinous product. Preferably, the polymerization temperature of dipentene is in the range of 40–50° C. Lower temperatures may be used to produce excellent products in high yields; however, more time is required, and for practical reasons, temperatures below 30° C. are not used normally. The higher temperatures, and particular temperatures above 55° C., result in products having darker colors and lower melting points, the last indicating a considerably lower degree of polymerization.

EXAMPLE 4

Three resins were prepared from the same quantities of materials and under the same conditions except for variations in the polymerization temperature.

In each instance 250 g. of toluene, 250 g. of naphtha, and 25 g. of aluminum chloride were charged into a flask. Five hundred g. of dipentene was then added gradually over a period of one hour, the temperature being held constant by the application of a heating bath initially and a cooling bath after the addition of dipentene was started. After the addition of dipentene was complete, the temperature was maintained constant for an additional hour to assure completion of the reaction. Thereafter 25 g. of calcium hydroxide and 25 g. of acid-activated clay were added. The flask was equipped with a water trap and a reflux condenser. The mixture in the flask was heated and agitated and solvent removed through the water trap until the pot temperature reached 140° C. No additional solvent was removed and the mixture was permitted to reflux overnight at 140° C. Hydrogen chloride vapors were evolved during distillation and reflux.

The mixture was filtered hot and the resin solution was transferred to distillation apparatus equipped with a steam sparge. The pot temperature was gradually raised to 210°–230° C. and steam sparged until 500 g. of water was condensed. The following table shows the effect of the variations in the polymerization temperatures.

| Polymerization temperature (°C.) | Yield of resin by weight, percent | Softening point (°C.) | Gardner color |
|---|---|---|---|
| 40 | 86 | 113 | 1–2 |
| 45 | 79 | 116 | 2 |
| 70 | 82 | 85 | 9 |

It has been found that the presence of a small amount of a terpene peroxide in the terpene being polymerized reduces the yield and increases the formation of color bodies. Terpenes such as dipentene readily oxidize to a peroxide upon exposure to air and while peroxide-free terpene can be produced, it has been found that peroxides readily form when the dipentene is stored. The addition of an antioxidant to the dipentene prevents the formation of peroxides. It has been discovered that phenolic antioxidants may be added to the dipentene to prevent the formation of the hydroperoxides during storage and that the antioxidant-containing dipentene may be readily polymerized. The antioxidant does not interfere with the polymerization of the terpene and in addition, the antioxidant is readily removed when the resin solution is filtered with an adsorbent material. The presence of the antioxidant in the finished resin is undesirable especially when the resin is used in an adhesive or other manner in connection with food packaging. The phenolic antioxidant compounds are well known and include polyphenols containing ortho and para-hydroxyl groups. Such antioxidants are described in "Encyclopedia of Chemical Technology," Raymond E. Kirk and Donald Othmer, vol. 2, p. 71, 1941. Representative phenolic antioxidants include hydroquinnone, pyrocatechol, pyrogallol, sesamol (3,4-methylenedioxyphenol), 3-phenylisocoumaraonone, $\alpha$-naphthol, and alkylene bis phenols containing a hydroxyl group on each benzene ring in the para position.

EXAMPLE 5

Two polydipentene resins were prepared in exactly the same manner from two different batches of dipentene. The first batch contained 0.88% terpene peroxides. The second batch of dipentene contained 0.1% 4,4'-methylene bis (2,6-di-tert. butylphenol) as an antioxidant. In each instance 500 g. of the dipentene was gradually added to 250 g. toluene and 250 g. naphtha containing 25 g. of aluminum chloride. The polymerization temperature was maintained at 40° C. After the addition of dipentene was complete, the mixture was allowed to stand for one hour to complete the reaction. Thereafter, 25 g. of calcium hydroxide and 25 g. of acid-activated clay was added. The mixture was heated with stirring and solvent was removed until the pot temperature reached 140° C. Thereafter, no more solvent was removed and the mixture was refluxed overnight.

The resin solution was filtered while hot and transferred to a pot equipped for distillation. The pot temperature was raised to 210°–220° C. to remove most of the solvent and the contents sparged with steam until 500 ml. of water had been collected in the distillate. The yield of each resin was determined based on the dipentene charged. The softening point of each resin was determined by the ball and ring method (as previously described) and the color of a 50% solution of each resin in mineral spirits was determined.

| Dipentene | Yield, percent | Softening point °C.) | Gardner color |
|---|---|---|---|
| 0.88% terpene peroxides | 75.2 | 67 | 3 |
| Peroxide-free+antioxidant | 86.0 | 113 | 1-2 |

The resin produced from the dipentene containing the antioxidant was substantially free of antioxidant as a result of the filtration with the adsorbent material. It is to be noted that the presence of the peroxides not only reduced the yield and increased the color but also resulted in the formation of a resin having a much lower softening point as a result of the peroxides interfering with the polymerization by deactivation of the catalyst. This effect of the peroxides has been found to be consistent.

The amount of antioxidant used depends to a certain extent upon storage conditions. However, in general, from 0.5% to 1% is sufficient. More antioxidant may be used. However, it is usually unnecessary and, of course, must be removed.

In all of the foregoing examples the acid-activated clay was clay which had been treated with acid to remove some of the aluminum and magnesium ions. It has been found that finely-divided clays may be used which have not been acid-activated, for example, Fuller's earth may be used. Preferably, the clay is in a finely-divided condition to provide a relatively large adsorbent area. While no particular degree of fineness is required, however, at least most of the particles preferably should pass a 100 mesh screen. In general, from 1%–10% of finely-divided clay may be used. Smaller amounts tend not to be sufficiently effective and larger amounts are not normally required. Similarly, the amount of basic material, such as calcium oxide or calcium hydroxide, may be within the range of from 1% to 10% by weight of the dipentene charged. The use of lime with finely-divided clay is described in U.S. Patent No. 2,555,221.

In the foregoing examples, the solution containing the polymerized dipentene is heated to remove the toluene and to aid in dechlorination of the mixture. In general, the solution can be heated to a temperature in the range of 110°–200° C. to effect dechlorination with the preferred temperature being in the range of 115°–170° C. During this heating step or prior thereto the aromatic solvent is removed. While some of the naphtha may be removed, preferably, the final portion of this heating step is carried under substantially full reflux so that naphtha will not have to be added before filtration. If necessary, naphtha may be added to obtain the desired viscosity for filtration.

We claim:

1. The process of producing polyterpene resins comprising the steps of polymerizing substantially peroxide-free terpene in a solvent medium in the presence of a phenolic antioxidant and a metal halide polymerization catalyst, and thereafter recovering the polyterpene resin.

2. The process of producing polyterpene resins comprising the steps of polymerizing substantially peroxide-free terpene in a solvent medium in the presence of a phenolic antioxidant and a metal halide catalyst, filtering the polyterpene resin solution in the presence of clay, whereby the clay adsorbs the antioxidant, and recovering the polyterpene resin from the filtrate.

3. The process of producing polyterpene resins comprising the steps of adding a phenolic antioxidant to terpene while substantially free of peroxides, polymerizing the terpene in a solvent medium in the presence of a metal halide polymerization catalyst, adding finely divided clay to the polyterpene resin solution, filtering the solution to separate the clay and adsorbed antioxidant, and recovering the polyterpene resin from the filtrate.

4. The process of producing polydipentene resins comprising the steps of polymerizing substantially peroxide-free dipentene in a solvent medium in the presence of a phenolic antioxidant and aluminum chloride catalyst, and thereafter recovering the polydipentene resin.

5. The process of producing polydipentene resins comprising the steps of polymerizing substantially peroxide-free dipentene in a solvent medium in the presence of a phenolic antioxidant and aluminum chloride catalyst, filtering the polydipentene resin solution in the presence of clay, whereby the clay adsorbs the antioxidant, and recovering the polydipentene resin from the filtrate.

6. The process of producing polydipentene resins comprising the steps of adding a phenolic antioxidant to dipentene while substantially free of hydroperoxides of dipentene, polymerizing the dipentene in a solvent medium in the presence of aluminum chloride polymerization catalyst, adding finely-divided clay to the polydipentene resin solution, filtering the solution to separate the clay and adsorbed antioxidant, and recovering the polydipentene resin from the filtrate.

References Cited

UNITED STATES PATENTS 2,319,386   5/1943   Carmody et al. _____ 260—93.3
3,255,255   6/1966   Orloff _____ 260—45.95

JOSEPH L. SCHOFER, *Primary Examiner.*

L. EDELMAN, *Assistant Examiner.*

U.S. Cl. X.R.

260—45.95, 33.4